a corporation of Germany

2,976,317
N(ALKYL-, CYCLOALKYL-, AND CYCLOALKYL-ALKYLSULFONYL)-N'(ALKYL-, ALKENYL-, CYCLOALKYL, AND CYCLOALKYLALKYL)-UREAS

Heinrich Ruschig, Bad Soden (Taunus), Walter Aumüller, Gerhard Korger, Hans Wagner, and Josef Scholz, Frankfurt am Main, and Alfred Bander, Hofheim (Taunus), Germany, assignors to Farbwerke Hoechst Aktiengesellschaft vormals Meister Lucius & Brüning, Frankfurt am Main, Germany, a corporation of Germany No Drawing. Filed July 31, 1956, Ser. No. 601,130

Claims priority, application Germany Oct. 19, 1955

9 Claims. (Cl. 260—553)

It is known from literature that certain compounds belonging to the class of aminobenzene sulphonamides are capable of lowering the blood sugar value in test animals, for example, of dogs. Thus, for example, para-aminobenzenesulphonamido-isopropyl-thiodiazole produces a moderate lowering of the blood sugar value in dogs for 4 to 6 hours (compare: Jean la Barre and Jean Reuse, Arch. néerland. physiol. 28 (1947) page 475).

There are also known certain benzene-sulphonyl ureas, such as N-benzenesulphonyl-urea, N-benzenesulphonyl-N'-phenyl-urea, N-benzenesulphonyl-N':N'-diethyl-urea, N-para-toluene sulphonyl-urea and N-para-toluenesulphonyl-N'-phenyl-urea (compare: Chem. Rev., volume 50, page 28/29). However, these substances have not yet attained any commercial importance. Other products belonging to the series of sulphonyl-ureas are known from U.S. Patent No. 2,390,253 and French Patent No. 993,465.

The present invention provides sulphonyl-ureas of the general formula

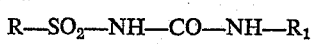

$$R-SO_2-NH-CO-NH-R_1$$

in which R represents an alkyl, cycloalkyl or cycloalkylalkyl radical containing 4–7 carbon atoms, and $R_1$ represents an alkyl, alkenyl, cycloalkyl or cycloalkylalkyl radical containing 2–8 carbon atoms and non-toxic basic salts thereof.

The radical R may be, for example, butyl-, pentyl-, hexyl-, cyclohexyl-, or cycloalkyl-alkyl groups, such as the hexahydrobenzyl group. When aliphatic residues are present, they may have straight or branched chains.

$R_1$ may be, for example, an ethyl, propyl, allyl, butyl, butylene, pentyl, hexyl, cyclohexyl or hexahydrobenzyl group. Also in this case, the aliphatic residues may have straight or branched chains.

The compounds of the above general formula are made by methods known for making sulphonyl-ureas. As examples the following processes may be mentioned:

An alkyl-, cycloalkyl- or cycloalkylalkyl-sulphonyl isocyanate, may be reacted with a primary butylamine or another primary alkylamine or an alkenylamine, cycloalkylamine or cycloalkyl-alkylamine containing 2–8 carbon atoms. Conversely, the desired sulphonyl-urea can be made by reacting a butyl isocyanate or other appropriate isocyanate with an alkyl-, cycloalkyl- or cycloalkylalkyl-sulphamide, advantageously in the form of a salt thereof. Instead of isocyanates there may be used compounds convertible into isocyanates in the course of the reaction, such as acid azides, for example, valeric acid azide. In another process for making the new compounds there are used, instead of isocyanates, urethanes; and any desired carbamic acid ester, such as methyl, ether, propyl, butyl or aryl esters, can be used for this purpose. For example, an alkyl-, cycloalkyl- or cycloalkylalkyl sulphonyl-urethane may be reacted, for example, with butylamine or another primary amine, or, conversely, an alkylurethane may be reacted with an appropriate alkyl-, cycloalkyl- or cycloalkylalkyl sulphamide, advantageously in the form of a salt thereof. Carbamic acid halides can also be used with special advantage. Thus, for example, the new sulphonyl-ureas are formed by reacting a butylcarbamic acid chloride with an alkyl-, cycloalkyl- or cycloalkylalkyl sulphamide, or by reacting an alkyl-, cycloalkyl- or cycloalkylalkyl sulphonyl-carbamic acid chloride with a butylamine or another primary amine. In a further process an alkyl-, cycloalkyl- or cycloalkylalkyl sulphonyl-urea, which is unsubstituted or substituted by other radicals, such as acyl and —$SO_2$—R, in the —$NH_2$ group, is converted into an alkyl-, cycloalkyl- or cycloalkylalkyl sulphonyl-alkyl-urea by reaction with amines of the formula $H_2N-R_1$, for example butylation, if desired with butylamine or other primary amines. Alternatively, an alkyl-urea may be reacted with an alkyl-, cycloalkyl- or cycloalkylalkyl sulphamide. Instead of the alkyl-ureas there may be used the corresponding iso-urea ethers, advantageously in the form of their salts, and they are reacted with alkyl-, cycloalkyl- or cycloalkylalkyl sulphonic acid chlorides, and the product so obtained is then converted by acid hydrolysis into the desired sulphonyl-urea. Instead of the alkyl-ureas or the corresponding iso-urea ethers, other derivitives may be used.

In further processes for making the new compounds the corresponding thiourea is first prepared, and sulphur is eliminated therefrom in a conventional manner; or an alkyl-, cycloalkyl- or cycloalkylalkyl sulphonyl-N'-alkyl-guanidine is prepared in known manner (for example, reacting an alkyl-, cycloalkyl- or cycloalkylalkyl sulphonyl-cyanamide with a butylamine or with another primary amine), and the resulting guanidine is then hydrolysed. In all cases there may be used, instead of butylamine, another primary alkylamine, or an alkenylamine, cycloalkylamine or cycloalkylalkyl-amine. In these reactions the components are always to be chosen in such a manner that the radical $R_1$ contained in the reaction product contains 2–8 carbon atoms and the radical R contains 4–7 carbon atoms.

The primary amines used as starting materials in the above processes advantageously contain saturated or unsaturated aliphatic or cycloaliphatic hydrocarbon radicals containing 4 to 6 carbon atoms. However, they may contain also 7 and 8 carbon atoms, but radicals of higher molecular weight generally reduce the activity of the products.

The reaction conditions under which the aforesaid processes are carried out may vary within wide limits and are adapted to each particular case. For example, the reactions may be carried out with the use of solvents at room temperature or at a higher temperature. Particularly suitable are the following processes:

(1) The reaction of a compound of the general formula R—$SO_2$—$NH_2$, in which R has the meaning given above, and advantageously in the form of a suitable alkali metal salt, with an isocyanate of the general formula $R_1$—NCO in the presence of a solvent, for example, nitrobenzene or acetone, at the ordinary or a higher temperature.

(2) The reaction of a sulphonyl-carbamic acid ester of the general formula R—$SO_2$—NH—COO—$R_2$, in which R has the meaning given above, and $R_2$ represents any desired, preferably lower, hydrocarbon residue, with an equivalent quantity of an amine of the formula $R_1$—$NH_2$. In this case it is advantageous to use as solvent a glycol-monoalkyl ether and to conduct the reaction at a temperature within the range of 100° C. to 140° C. In this reaction the ratio of the reactants to solvent may be of importance; advantageously the proportion of solvent amounts to 55-65 percent of the total quantity of the reaction mixture.

To obtain the products in as pure a state as possible, it is advantageous to separate the product thoroughly from the alkyl-, cycloalkyl- or cycloalkylalkyl sulphamide used as starting materials or formed in the course of the reaction. Advantageously, this is carried out taking up the product in dilute ammonia (1 part by volume of ammonia to 20-30 parts by volume of water), since the sulphamides are generally sparingly soluble in this medium at room temperature.

As starting materials there may be mentioned: alkyl-, cycloalkyl- or cycloalkyl-alkyl-sulphonylamides or -sulphonyl isocyanates containing as alkyl groups, for example, butyl-(1)-, butyl-(2)-, 2-methyl-propyl-(1), pentyl-(2)-, pentyl-(3), 3-methylbutyl-(1), 2-methylbutyl-(1)-, hexyl-(1)-, hexyl-(2)-, 4-methylpentyl-(2), 2-ethylbutyl-(1)-, 2:4-dimethylpentyl-(1)-, 2:4-dimethylpentyl-(3)- groups residues; or containing as cycloalkyl groups, advantageously, cyclohexyl, methylcyclohexyl and cyclopentyl groups; or containing as cycloalkyl-alkyl groups, for example, cyclohexylmethyl or cyclohexylethyl groups; alkyl-, cycloalkyl- or cycloalkyl-alkyl-sulphonyl urethanes containing in the urethane component a lower alkyl group, for example, a methyl, propyl, butyl or especially an ethyl group, or an aryl radical; alkyl-, cycloalkyl- or cycloalkyl-alkyl-sulphonyl-ureas; and correspondingly substituted alkyl-, cycloalkyl- or cycloalkyl-alkyl-sulphonic acid halides.

For the reaction with the compounds mentioned above there may be used the following primary amines: As alkylamines there may be mentioned, for example, ethylamine, n-propylamine, isopropylamine, n-butylamine, isobutylamine, secondary butylamine, tertiary butylamine, pentylamine-(1), pentylamine-(2), pentylamine-(3), 3-methyl-butylamine-(1), 2-methyl-butylamine-(1), 2:2-dimethyl-propylamine-(1), 3-methyl-butylamine-(2), hexylamines such as hexylamine-(1) and 2-methyl-pentylamine-(1), heptylamines such as heptylamine-(1) and heptylamine-(4), and octylamines such as octylamine-(1).

There may be mentioned as examples of alkenylamines, e.g. allylamine and crotylamine; as cycloalkylamines, e.g. cyclohexylamine and cyclopentylamine; and as cycloalkyl-alkylamines, e.g. cyclohexyl-methylamine and cyclohexyl-ethylamine.

Instead of using the aforesaid amines, the corresponding isocyanates, urethanes, carbamic acid halides, ureas or isourea ethers (obtainable from the aforesaid amines) may be reacted with alkyl-, cycloalkyl- or cycloalkylalkyl sulphamides or halides.

When the synthesis of the desired sulphonyl-urea starts from a corresponding thiourea, for example, from cyclohexane- or butane sulphonyl-N'-alkyl-, alkenyl-, -cycloalkyl- or -cycloalkylalkyl-thioureas the hydrocarbon radicals containing 2-8 carbon atoms, the sulphur may be eliminated with a heavy metal oxide or a salt thereof, for example, an oxide or salt of lead, copper or silver, in an aqueous or alcoholic solution.

Alternatively, the desired sulphonyl-urea can be prepared by hydrolysing an appropriately constituted guanidine with a dilute acid or alkaline solution.

As has been demonstrated by experiments on animals and in clinical tests, the products of the invention produce a substantial lowering of the blood sugar level. They may be used as such or in the form of their salts, or in the presence of substances that cause salt formation. For salt formation there may be used, for example, ammonia, an alkaline substance such as an alkali metal or alkaline earth metal hydroxide, an alkali metal carbonate or bicarbonate, or a physiologically tolerated organic base. These salts have the same blood sugar lowering properties. It is assumed that, by the alkaline reactions in the alimentary tract, the compounds are converted into their salts. The compounds can be made up, inter alia, into preparations suitable for oral administration and lowering the blood sugar in the treatment of diabetes. The preparations suitable for oral administration, for example tablets and dragées, can for instance be prepared by homogeneously mixing the following ingredients, granulating them in the moist state, if necessary, and drying and pressing them.

0.5 gram of a compound of the general formula $R-SO_2-NH-CO-NH-R_1$, in which R stands for an alkyl, cycloalkyl or cycloalkylalkyl radical with 4–7 carbon atoms and $R_1$ represents an alkyl, alkenyl, cycloalkyl or cycloalkylalkyl radical with 2–8 carbon atoms.

0.1395 gram of wheat or maize starch.

0.0075 gram of talcum.

0.0030 gram of magnesium stearate.

A further object of the present invention is, therefore: Pharmaceutical preparations which contain a compound of the general formula $$R-SO_2-NH-CO-NH-R_1$$

wherein R is a member selected from the group consisting of alkyl-, cycloalkyl- and cycloalkylalkyl radicals having 4 to 7 carbon atoms and $R_1$ is a member selected from the group consisting of alkyl-, alkenyl-, cycloalkyl- and cycloalkylalkyl radicals having 2 to 8 carbon atoms, and carriers, diluents and/or other products usually applied for the manufacture of pharmaceutical preparations.

In animal tests the action on the blood sugar level has been demonstrated, for example, on mice, rats, guinea pigs, rabbits, cats and dogs. When, for instance, a compound of the invention is administered to normally fed rabbits in a single average dose of 400 mg./kg. in, for example, a solution rendered alkaline with bicarbonate, or in the form of an alkali metal salt, a lowering of the blood sugar level sets in rapidly and reaches a maximum (about 30 to 40 percent of the initial value) in the course of about 3 to 4 hours.

The blood sugar level can be measured by hourly analyses by the method of Hagedorn-Jensen. The lowering of the blood sugar is determined by comparison with the blood-sugar level of control animals fed in the same way but not so treated.

The activity of the products of the invention is shown in the following table:

TABLE I

| Substance (in the form of the sodium salt) | Maximum lowering of blood sugar in the rabbit; dose: 400 mg./kg. per os |
|---|---|
| | Percent |
| N-(cyclohexane-sulphonyl)-N'-n-butyl-urea | 40 |
| N-(cyclohexane-sulphonyl)-N'-cyclohexyl-urea | 30 |
| N-(butane-sulphonyl)-N'-n-butyl-urea | 33 |
| N-(cyclohexane-sulphonyl)-N'-cyclohexyl-methyl-urea | 30 |
| N-(cyclohexane-sulphonyl)-N'-n-hexyl-urea | 40 |
| N-(cyclohexane-sulphonyl)-N'-allyl-urea | 20 |
| N-(cyclohexylmethane-sulphonyl)-N'-n-butyl-urea | 20 |
| N-(pentane-3-sulphonyl)-N'-hexyl-(1)-urea | 20 |
| N-(cyclohexane-sulphonyl)-N'-ethyl-urea | 30 |
| N-(cis, trans-4-methyl-cyclohexane-sulphonyl)-N'-n-butyl-urea | 25 |
| N-(cyclohexane-sulphonyl)-N'-isoamyl-urea | 25 |
| N-(3-methyl-butane-sulphonyl)-N'-n-butyl-urea | 30 |
| N-(cyclohexane-sulphonyl)-N'-n-octyl-urea | 15 |

The testing of the compounds on dogs has the advantage in that the blood sugar level exhibits smaller individual variations than in rabbits. In the canine tests the administration of small doses even of the free sulphonyl-ureas yields readily reproducible values. When the compound to be tested is administered to a dog, prior to feeding it, in a single dose of 100 mg./kg., and the blood sugar level is determined at certain intervals, the reductions in the blood sugar level shown in the following table are observed:

TABLE II

| Substance | Lowering of blood sugar level of the dog | |
|---|---|---|
| | Percent | after— hours |
| N-(cyclohexane-sulphonyl)-N'-n-butyl-urea | 35 / 40 / 0 | 3 / 5 / 24 |
| N-(butane-sulphonyl)-N'-n-butyl-urea | 27 / 10 / 0 | 6 / 24 / 48 |
| N-(cyclohexane-sulphonyl)-N'-isobutyl-urea | 40 / 30 / 0 | 2 / 6 / 24 |
| N-(cyclohexane-sulphonyl)-N'-2,4-dimethyl-pentyl-(3)-urea | 25 / 0 | 6 / 24 |

The above values were determined by comparison with the blood sugar levels measured on similarly fed, but untreated control animals.

The compounds of the invention are usually extremely well tolerated. Their acute toxicity (tested on mice or rats), as can be seen from the following table, is between 1 and several gram/kg. at an $LD_{50}$, for oral administration:

TABLE III

| Substance | $LD_{50}$, in gram/kg. of body weight, administered orally to mice |
|---|---|
| | Grams |
| N-(cyclohexane-sulphonyl)-N'-n-butyl-urea (in the form of the sodium salt) | 2 |
| N-(cyclohexane-sulphonyl)-N'-cyclohexyl-urea | 4.5 |
| N-(3-methyl-butanesulphonyl)-N'-n-butyl-urea | 6.5 |
| N-(cyclohexane-sulphonyl)-N'-isobutyl-urea | 7.7 |
| N-(cyclohexane-sulphonyl)-N'-cyclohexyl-urea | 4.5 |
| N-(butane-sulphonyl)-N'-n-butyl-urea | 4.4 |

As compared with compounds of similar constitution of the sulphanilyl series the compounds of the present invention are distinguished, on one hand, in that they are more resistant to external oxidising influences, such as atmospheric oxygen, which is of importance to their shelf-life and handling, and, on the other, in that they have no bacteriostatic action.

Furthermore, the new compounds do not produce digestive disturbances caused by action on the bacterial flora of the alimentry tract. The following examples serve to illustrate the invention, but they are not intended to limit it thereto:

*Example 1.—N-cyclohexanesulphonyl-N'-butyl-(1)-urea*

120 grams of dry powdered potassium carbonate are added to a solution of 57 grams of cyclohexane-sulphamide in 700 cc. of dry acetone, and the suspension is refluxed while stirring, for 2 hours. 35 grams of n-butyl isocyanate are then slowly added dropwise, while stirring, at 50° C., and the mixture is further stirred at the same temperature until the odour of isocyanate has disappeared. The precipitate is filtered off with suction, the mother liquor is evaporated, and the residue, together with the precipitate, is dissolved in water. The undissolved matter is filtered off, the solution is decolorised with carbon and carefully acidified in the cold with hydrochloric acid. The solution is then suction-filtered, and the residue is dissolved in dilute ammonia solution. The solution is clarified with carbon and carefully acidified with dilute acetic acid. A good yield of N-cyclohexane-sulphony-N'-butyl-(1)-urea is obtained. It is filtered off with suction, thoroughly washed with water and recrystallised from ethanol or acetonitrile. It melts at 135–136° C.

In analogous manner there is obtained with the use of isobutyl isocyanate, N-cyclohexanesulphonyl-N'-isobutyl-urea, melting at 167–168° C. after recrystallisation from methyl acetate.

By dissolving the N-(cyclohexanesulphonyl)-N'-butyl-urea in the equivalent quantity of a 1N-sodium hydroxide solution and evaporating the filtered solution to dryness under reduced pressure the sodium salt of N-(cyclohexanesulphonyl)-N'-butyl-urea is obtained in the form of an amorphous powder. After recrystallization from aqueous acetonitrile the salt melts at 194–195° C. It is easily soluble in water. The aqueous solution has a pH-value of 8–9.

*Example 2.—N-cyclohexanesulphonyl-N'-cyclohexyl-urea*

17 grams of cyclohexane-sulphamide and 14 grams of cyclohexylisocyanate are reacted in 300 cc. of acetone as solvent and in the presence of 40 grams of potassium carbonate, as described in Example 1. N-cyclohexanesulphonyl-N'-cyclohexyl-urea is obtained in a good yield. After recrystallisation from acetonitrile it melts at 150–151° C.

With the use of n-hexyl isocyanate there is obtained in a similar manner N-cyclohexanesulphonyl-N'-n-hexyl-(1)-urea which, after recrystallisation from diisopropyl ether, melts at 95–96° C.

*Example 3.—N-butanesulphonyl-N'-butyl-(1)-urea*

150 grams of dry powdered potassium carbonate are added to a solution of 60 grams of butane-(1)-sulphamide in 500 cc. of dry acetone, and the reaction mixture is refluxed, while stirring, for 2 hours. 44 grams of n-butyl isocyanate are then slowly added dropwise, while stirring, at 50° C., and the mixture is stirred at 50° C. until the odour of isocyanate has disappeared. The mixture is diluted with 500 cc. of diisopropyl ether and cooled to 0° C. The precipitate is filtered off well with suction and dissolved in water. The alkaline aqueous solution is shaken with chloroform, the chloroform is separated, and the aqueous solution is treated with carbon and then cautiously acidified with hydrochloric acid in the cold. The sulphonyl-urea, obtained in a good yield, is purified by dissolving it in dilute ammonia solution, clarifying the solution with carbon, and reprecipitating the N-butanesulphonyl-N'-butyl-(1)-urea with dilute acetic acid, filtering it off with suction and thoroughly washing it with water. After recrystallisation from diisopropyl ether the product melts at 103° C.

*Example 4.—N-cyclohexanesulphonyl-N'-isoamyl-urea*

19 grams of isoamylamine are slowly added dropwise, while stirring, to a solution of 38 grams of cyclohexanesulphonyl-isocyanate (boiling at 88–94° C. under 0.5 mm. Hg pressure, and prepared from cyclohexane-sulphonamide and phosgene) in 150 cc. of absolute benzene. The mixture is refluxed for 1 hour, and the benzene is then distilled off. The residue is dissolved in dilute ammonia solution, the solution is clarified with carbon and acidified with warm hydrochloric acid. After the mixture has cooled, it is suction-filtered, and the filter residue is washed with a little dilute acetic acid. A good yield of N-cyclohexane-sulphonyl-N'-isoamyl-urea is obtained. It is dried in vacuo and recrystallised from methyl acetate. It melts at 128–129° C.

In analogous manner there is obtained:

(a) with the use of allylamine (13 grams): N-cyclohexane-sulphonyl-N-allyl-urea melting at 153–154° C.;
(b) with the use of cyclohexylmethylamine (25 grams): N - cyclohexanesulphonyl - N' - cyclohexylmethyl-urea melting at 149–150° C.; and
(c) with the use of 2:4-dimethyl-pentylamine-(3) (25 grams): N-cyclohexanesulphonyl-N' - [2:4 - dimethylpentyl-(3)]-urea melting at 165–166° C.

*Example 5.—N-(3-methyl-butanesulphonyl)-N'-butyl-(1)-urea*

30.2 grams of 3-methyl-butane-(1)-sulphamide and 50 grams of powdered potassium carbonate are dissolved or suspended in 300 cc. of acetone, 24 grams of n-butyl isocyanate are added, and the mixture is refluxed, while stirring, for 3 hours until the odour of isocyanate can no longer be detected. The mixture is then cooled, the precipitate is filtered off with suction, and washed with acetone. The precipitate is dissolved in water, the solution is clarified with carbon and cautiously acidified with hydrochloric acid. N-(3-methyl-butanesulphonyl)-N'-butyl-(1)-urea, obtained in a good yield, is filtered off with suction, thoroughly washed with water, dried and recrystallised from diisopropyl ether. The product melts at 120-121° C.

By dissolving the urea in the equivalent quantity of a 1N-potassium hydroxide solution and evaporating the filtered solution, the potassium salt of the N-(3-methyl-butane-1-sulphonyl)-N'-butyl-(1)-urea is obtained in the form of an amorphous powder. After recrystallisation from aqueous acetonitrile, the salt melts at 199° C. It is easily soluble in water. The pH-value of the aqueous solution amounts to 8.

*Example 6.—N-(cyclohexylmethane-sulphonyl)-N'-butyl-(1)-urea*

40 grams of the sodium salt of cyclohexyl-methane-sulphonamide and 26 grams of n-butyl isocyanate are refluxed, while stirring, in 500 cc. of acetone for 5 hours. After being cooled, the whole is suction-filtered, and the residue is washed with acetone and dissolved in 300 cc. of water. The solution is clarified with carbon and acidified with warm acetic acid. A good yield of N-(cyclohexyl-methane-sulphonyl)-N'-butyl-(1)-urea is obtained. It is filtered off with suction and washed with water. After recrystallisation from methyl acetate, it melts at 126-127° C.

*Example 7.—N-(pentane-3-sulphonyl)-N'-hexyl-(1)-urea*

33 grams of hexyl-(1)-isocyanate are slowly added dropwise, while stirring, at 40° C. to a suspension of 38 grams of the sodium salt of pentane-3-sulphonamide in 300 cc. of acetone, and the mixture is then refluxed for 3 hours, cooled, the precipitate is filtered off with suction, and the mother liquor is evaporated. The solid residue from the mother liquor, together with the precipitate, is dissolved in 500 cc. of water containing some ammonia. The solution is clarified with carbon, and then acidified with hydrochloric acid. The N-(pentane-3-sulphonyl)-N'-hexyl-(1)-urea, obtained in good yield, is filtered off with suction, washed with water, dried, and recrystallised from diisopropyl ether. It melts at 90-91° C.

*Example 8.—N-(heptane-1-sulphonyl)-N'-hexyl-(1)-urea*

28 grams of hexyl-(1)-isocyanate are slowly added dropwise, while vigorously stirring at 10° C., to a solution of 35.8 grams of heptane-1-sulphamide in 400 cc. of 0.5 N-sodium hydroxide solution and 500 cc. of acetone. The reaction mixture is stirred for 3 hours at room temperature and finally refluxed for 1 hour. The main part of the precipitate that has separated at first dissolves again. The solution is diluted with 1 liter of water, acidified with acetic acid and cooled to 0° C. The precipitate that has separated is filtered off with suction and washed well with water. For purification the precipitate is digested for some time in 2.5 liters of dilute ammonia, the solution is clarified with animal charcoal and again acidified in the cold with acetic acid. The N-(heptane-1-sulphonyl)-N'-hexyl-(1)-urea that has separated is filtered off with suction, washed well with water and, after drying, recrystallised from acetonitrile. It melts at 103-104° C.

The N-(heptane-1-sulphonyl)-N'-(n-butyl)-urea obtained in analogous manner from heptane-1-sulphamide and n-butyl-isocyanate melts at 90-91° C.

*Example 9.—N-(cyclohexanesulphonyl)-N'-ethyl-urea*

A solution 20 of grams of ethylamine in 80 cc. of benzene is added dropwise, while stirring, to a solution of 25 grams of cyclohexanesulphonyl-isocyanate in 100 cc. of benzene. The reaction mixture is refluxed for 1 hour, and cooled. The precipitate that has separated is filtered off with suction. After drying it is dissolved in 500 cc. of water with addition of a little ammonia. The solution is clarified with animal charcoal and acidified with hydrochloric acid. The precipitate, that separates at first in the form of a smeary mass but crystallises soon, is filtered off with suction and washed well with water. For purification the precipitate is dissolved in dilute ammonia, the solution is clarified with animal charcoal and cautiously acidified with hydrochloric acid. The N-(cyclohexanesulphonyl)-N'-ethyl-urea obtained in a good yield is filtered off with suction, washed with water and, after drying, recrystallised from acetonitrile. It melts at 147-149° C.

*Example 10.—N-(cis, trans-4-methyl-cyclohexane-sulphonyl)-N'-butyl-(1)-urea*

64 grams of cis, trans-4-methyl-cyclohexanesulphamide (oil; prepared from 4-methyl-cyclohexanethiol by oxidation with chlorine in dilute acetic acid and reaction of the sulphochloride obtained, which boils at 107-110° C., under a pressure of 1 mm. of mercury with liquid ammonia) are dissolved in 360 cc. of a 1N-sodium hydroxide solution and the solution is evaporated to dryness. The residue is digested for some time with 500 cc. of acetone and 250 cc. of ether and is then sucked off by means of a large suction filter. The sodium salt (laminae) is dried under reduced pressure. The yield amounts to 65 grams.

24 grams of n-butyl-isocyanate are added dropwise, while stirring at 40° C., to a suspension of 40 grams of the sodium salt of cis, trans-4-methyl-cyclohexane-sulphamide in 400 cc. of acetone. The reaction mixture is refluxed for 5 hours, and cooled. The precipitate is filtered off with suction and dissolved in water with addition of ammonia. The solution is clarified with animal charcoal and acidified again with hydrochloric acid. The precipitate that separates at first in the form of a smeary mass crystallises soon. It is sucked off and dissolved in 250 cc. of dilute ammonia (1:20).

This solution is slowly added dropwise, while stirring at 60° C., to 550 cc. of dilute hydrochloric acid (1:10). The N-(cis, trans-4-methyl-cyclohexanesulphonyl)-N'-butyl-(1)-urea, which separates in the form of crystals, is sucked off, washed well with water and dried under reduced pressure. It melts at 112° C. and sinters at 102° C.

*Example 11.—N-cyclohexanesulphonyl-N'-octyl-(1)-urea*

6.5 grams of n-octylamine are added dropwise, while stirring, to a solution of 9.5 grams of cyclohexanesulphonyl-isocyanate in 70 cc. of absolute benzene. The reaction mixture is refluxed for 1 hour. The benzene is distilled off and the residue is dissolved in dilute ammonia. The solution is clarified with animal charcoal and cautiously acidified with hydrochloric acid. The N-cyclohexanesulphonyl-N'-octyl-(1)-urea precipitating in a good yield is sucked off, washed well with water and dried. For purification the product is dissolved in ether and reprecipitated by cautiously adding petroleum ether. It melts at 100-101° C.

We claim:
1. Compounds selected from the group consisting of sulphonyl ureas of the general formula

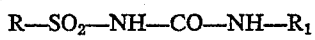

R—SO$_2$—NH—CO—NH—R$_1$ wherein R is a member selected from the group consisting of alkyl-, cycloalkyl- and cycloalkylalkyl radicals containing 4 to 7 carbon atoms, and R$_1$ is a member selected from the group consisting of alkyl-, alkenyl-, cycloalkyl- and cycloalkylalkyl radicals containing 2 to 8 carbon atoms and alkali-metal, alkaline earth metal, and ammonium salts thereof.

2. Sulphonyl ureas of the general formula

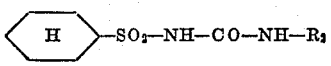

wherein $R_2$ is an alkyl radical containing 2 to 6 carbon atoms.

3. The compound of the formula

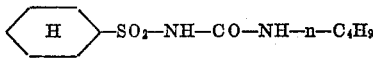

4. The compound of the formula

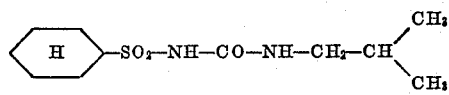

5. Sulphonyl ureas of the general formula

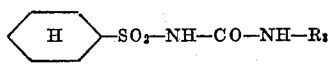

wherein $R_3$ represents a cycloalkyl radical containing 6 to 8 carbon atoms.

6. The compound of the formula

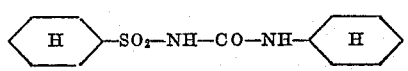

7. The compound of the formula

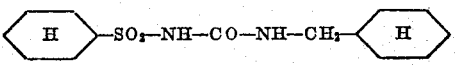

8. Sulphonyl ureas of the general formula

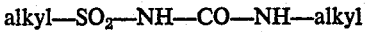

wherein the alkyl radicals contain 4 to 6 carbon atoms.

9. The compound of the formula

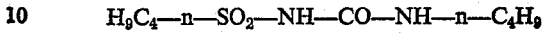

References Cited in the file of this patent

UNITED STATES PATENTS 2,390,253    Henke    Dec. 4, 1945

FOREIGN PATENTS 993,465    France    July 25, 1951
71,236    Norway    Nov. 4, 1946

OTHER REFERENCES

Goodwin et al.: The Pharmaceutical Journal, vol. 181:4952, pp. 233–235 (1958).

Lawrence et al.: British Med. Journal, pp. 700–702 (1958).

British Med. Journal, pp. 938–9, April 19, 1958.

Keele: The Lancet, pp. 243–6, Jan. 31, 1959.